United States Patent [19]
Odaka

[11] Patent Number: 5,467,161
[45] Date of Patent: Nov. 14, 1995

[54] CAMERA HAVING A LINE-OF-SIGHT SENSOR OPERATING IN PARALLEL WITH ANOTHER PHOTOGRAPHIC PROCESSING OPERATION

[75] Inventor: Yukio Odaka, Yokohama, Japan

[73] Assignee: Canon Kabushiki Kaisha, Tokyo, Japan

[21] Appl. No.: 193,884

[22] Filed: Feb. 9, 1994

Related U.S. Application Data

[63] Continuation of Ser. No. 62,339, May 17, 1993, abandoned.

[30] Foreign Application Priority Data

May 22, 1992 [JP] Japan .................................. 4-154161

[51] Int. Cl.[6] ............................. G03B 7/08; G03B 13/36; G03B 17/00
[52] U.S. Cl. .............................. 354/402; 354/410
[58] Field of Search ............................. 354/400, 402, 354/403, 62, 219, 410

[56] References Cited

U.S. PATENT DOCUMENTS

| | | | |
|---|---|---|---|
| 5,036,347 | 7/1991 | Tsunekawa et al. | 354/400 |
| 5,214,466 | 5/1993 | Nagano et al. | 354/402 |
| 5,245,371 | 9/1993 | Nagano et al. | 354/219 X |
| 5,245,381 | 9/1993 | Takagi et al. | 354/219 X |

FOREIGN PATENT DOCUMENTS

| | | |
|---|---|---|
| 3841575 | 7/1989 | Germany . |
| 61-172552 | 8/1986 | Japan . |

*Primary Examiner*—W. B. Perkey
*Attorney, Agent, or Firm*—Fitzpatrick, Cella, Harper & Scinto

[57] ABSTRACT

A camera includes a line-of-sight sensing circuit for sensing a position of a photographer's line-of-sight, and a processing circuit for controlling each of (i) the line-of-sight sensing operation and (ii) at least one other photographic processing operation. The processing circuit controls the line-of-sight sensing circuit to sense the photographer's line-of-sight in parallel with the at least one other photographic processing operation.

23 Claims, 8 Drawing Sheets

CAMERA HAVING A LINE-OF-SIGHT SENSOR OPERATING IN PARALLEL WITH ANOTHER PHOTOGRAPHIC PROCESSING OPERATION

This application is a continuation of application Ser. No. 08/062,339 filed May 17, 1993, now abandoned.

BACKGROUND OF THE INVENTION

1. Field of the Invention

The present invention relates to a camera having a photometric means for metering the brightness of a subject, a focus detecting means for detecting a focal state of a lens, and a line-of-sight sensing means for sensing the position of a line of sight within a viewfinder.

2. Description of the Related Art

A camera, having a photometric means for metering the brightness of a subject and an auto-focusing device for detecting a focal state of a lens and driving the lens to focus the lens is already popular.

A focus detecting means, arranged in an auto-focusing device, that detects the focal state not only at one point within a viewfinder (picture) but at multiple points (range-finding points) has been known. In this type of focus detecting means having multiple range-finding points, a range-finding point is selected on the basis of a photographer's watch point within the viewfinder (on the basis of line-of-sight information sent from a line-of-sight sensing means).

The aforesaid conventional camera, however, requires a certain amount of time for controlling a photometric means and computing a photometric value, a certain amount of time for controlling an auto-focusing device, and a certain amount of time for detecting a watch point within a viewfinder. These cumulative time amounts deteriorate a response characteristic of a camera; that is, by reducing speedup of auto-focusing or degrading a frame rate.

SUMMARY OF THE INVENTION

One object of the application is to provide, in consideration of the aforesaid problems, a camera realizing speedup of auto-focusing, upgrading a frame rate, and enabling instantaneous photography of an intended scene.

Another object of the application is to provide a camera that has a control means for handling in parallel any two of the operations of a photometric means, a focus detecting means, and a line-of-sight sensing means, and that performs the operations not in a time-series manner but simultaneously.

Yet another object of the application is to provide, in consideration of the aforesaid problems, a camera that uses hardware to read stored signals from a line-of-sight sensor, while using software implemented in a microcomputer to execute focus detection and other processing.

Other objects of the present invention will be apparent from an embodiment to be described below in conjunction with the drawings.

According to a first aspect of the present invention, a camera includes a line-of-sight sensing circuit for sensing a position of a photographer's line-of-sight, and a processing circuit for controlling each of (i) the line-of-sight sensing operation and (ii) at least one other photographic processing operation. The processing circuit controls the line-of-sight sensing circuit to sense the photographer's line-of-sight in parallel with the at least one other photographic processing operation.

According to another aspect of the present invention, a camera includes a line-of-sight sensing circuit for sensing a position of a photographer's line-of-sight. The line-of-sight sensing circuit includes a storage sensor for storing signals corresponding to the position of the photographer's line-of-sight. A microprocessor calculates (i) the position of the photographer's line-of-sight according to the signals stored in the storage sensor, and (ii) at least one other photographic computation. The microprocessor performs the at least one other photographic computation while the storage sensor stores the signals corresponding to the position of the photographer's light-of-sight.

According to yet a further aspect of the present invention, a camera includes a line-of-sight sensing circuit for sensing a position of a photographer's line-of-sight. The line-of-sight sensing circuit includes a storage sensor for storing signals corresponding to the position of the photographer's line-of-sight. A microprocessor calculates (i) the position of the photographer's line-of-sight according to the signals stored in the storage sensor, and (ii) at least one other photographic computation. A hardware circuit serially transfers the signals stored in the storage sensor to the microprocessor. The microprocessor performs the at least one other photographic computation while the hardware circuit is serially transferring the signals stored in the storage sensor to the microprocessor.

According to yet a further aspect of the present invention, a camera has a focus detecting circuit for detecting focus states in a plurality of focus detection areas, and a line-of-sight sensing circuit for sensing a position of a photographer's line-of-sight. The camera includes a control circuit for inhibiting the focus detecting circuit from performing further focus state detection when each of the following two conditions are satisfied: (i) the line-of-sight sensing circuit has completed line-of-sight sensing, and (ii) the focus detecting circuit has detected a focus state in a focus detection area associated with a sensed position of a photographer's line-of-sight.

According to still a further aspect of the present invention, a camera has a focus detecting circuit for detecting focus states in a plurality of focus detection areas and a line-of-sight sensing circuit for sensing a position of a photographer's line-of-sight. The camera includes a control circuit for controlling each of the focus detecting circuit and the line-of-sight sensing circuit to perform focus state detection and line-of-sight sensing in parallel.

DESCRIPTION OF THE PREFERRED EMBODIMENTS

The present invention will be described in detail in conjunction with an embodiment illustrated by the drawings.

Figure 2:
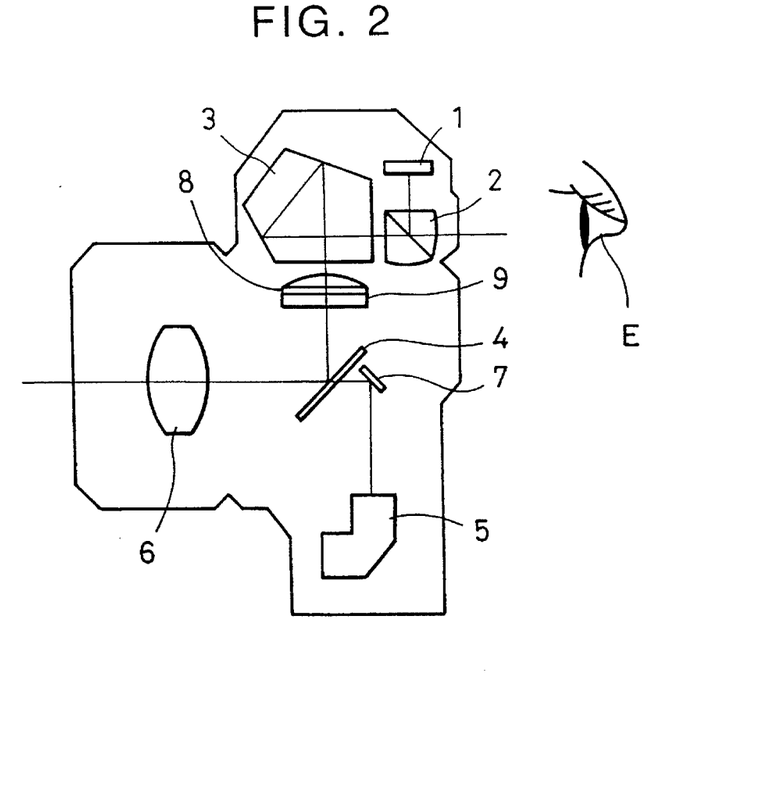
FIG. 2 is a layout of optical systems in a camera in an embodiment of invention.

FIG. 2 is a schematic view of a camera representing an embodiment of the present invention.

Light reflected from a subject and transmitted by a lens 6 passes through a main mirror 4, a condenser 8, a focusing screen 9, a pentaprism 3, and a dichroic mirror 2, and then reaches a photographer's eye E. Part of the light reflected from a subject and transmitted by the lens 6 passes through the main mirror 4 and reaches a focusing unit 5 via a sub-mirror 7.

The dichroic mirror 2 reflects light emerging from the eye E at an angle of, for example, 90°. The reflected light forms an image on a line-of-sight sensor 1 via an image forming lens which is not shown.

Very weak light originating from an LED or the like, which is not shown in FIG. 2, is irradiated to the eye E looking into an eyepiece of the camera. The reflected light forms an image on the line-of-sight sensor 1. Based on a position at which the image is formed, and other information, a line-of-sight sensing means which will be described later detects the position of a line of sight (watch point) within a viewfinder. As for a method for sensing the position of a line of sight, a method using a reflected image of a cornea and a central position of a pupil has been disclosed in Japanese Patent Laid-Open No. 61-172552. The detailed description of the method will be omitted.

Light reflected from a subject and transmitted by the lens 6 enters a photometric sensor which is not shown. A photometric computation circuit or the like meters light at any point within the viewfinder or reads averaged light.

Figure 1:
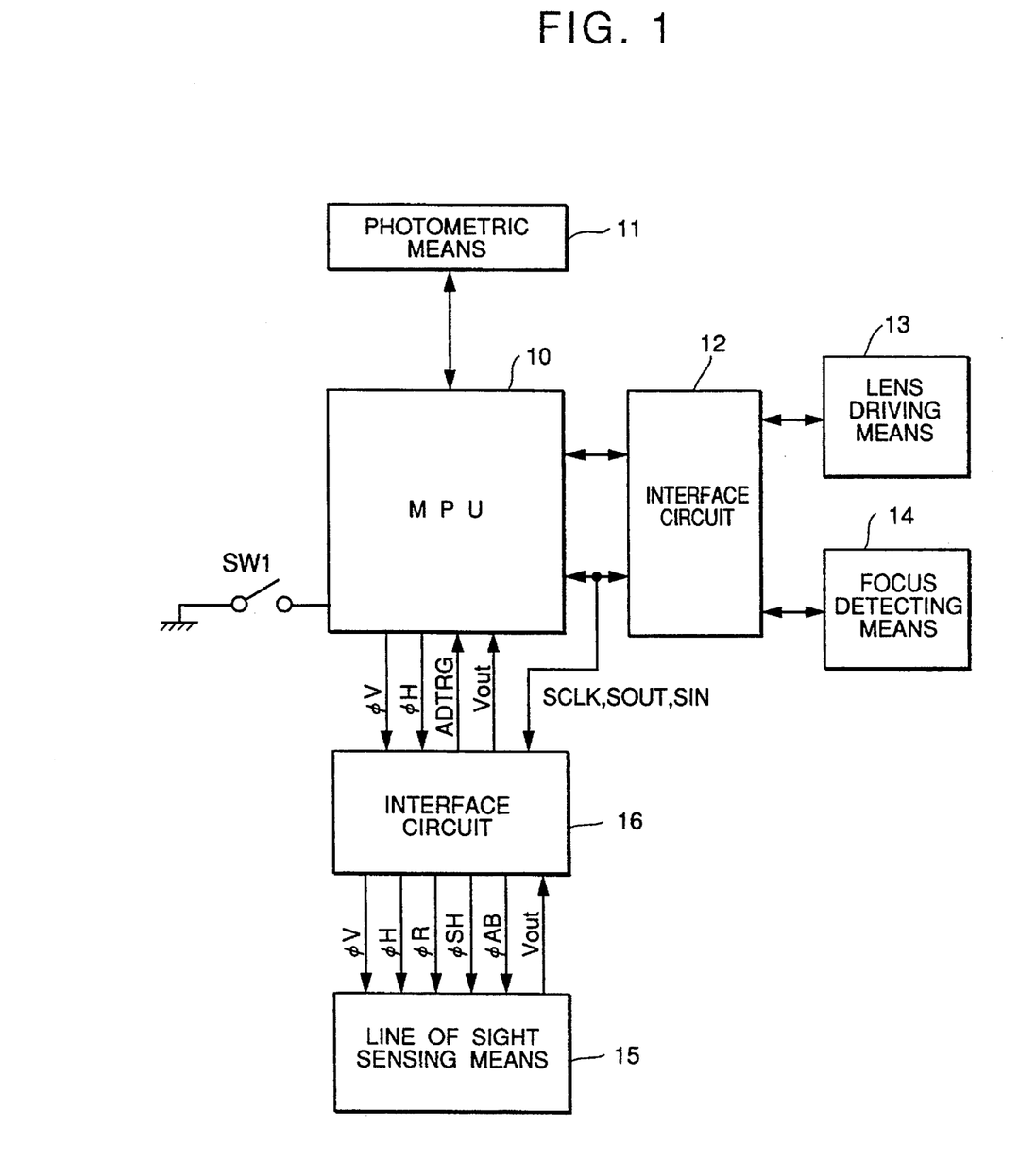
FIG. 1 is a block diagram showing a configuration of a main portion of a camera in an embodiment of the present invention.

FIG. 1 is a block diagram showing a circuitry of a portion of the camera of FIG. 2 relating to the present invention.

In FIG. 1, reference number 10 denotes a microprocessor unit (MPU) (hereinafter, microprocessor) that controls a series of camera operations; that is, the microprocessor controls the input of information from a photometric means, which will be described later, to calculate the brightness of a subject, or controls the input of information from a focus detecting means, which will be described later, to detect a focal state of the lens 6. The microprocessor 10 includes an A/D converter, and a pulse generator capable of outputting any pulses.

Reference number 11 denotes a photometric means that is connected to the microprocessor 10 and includes a photometric sensor for sensing the brightness of a subject. Reference number 12 denotes an interface circuit that is connected to each of the microprocessor 10, a lens driving means 13 (described later) for driving the lens, and a focus detecting means 14 (described later), and communicates information with these units. Reference number 13 denotes a lens driving means for driving the lens 6 and for focusing the lens 6. Reference number 14 denotes a focus detecting means (corresponding to a focusing unit in FIG. 1) having a focus detector for detecting a focal state of the lens 6. Reference number 15 denotes a line-of-sight sensing means having a line-of-sight sensor, which is a two-dimensional CCD area sensor, for detecting the position of a photographer's line of sight within the viewfinder. Reference number 16 denotes an interface circuit that is connected to the microprocessor 10 and communicates information with the line-of-sight sensing means 15. SW1 is a switch that is connected to the microprocessor 10 and used to start control of photometric computation, focus detection, or line-of-sight sensing. The focus detecting means 14 has multiple range-finding sensors associated with multiple range-finding areas.

A method for driving the line-of-sight sensor in the line-of-sight sensing means 15 and a method for reading stored signals will be described.

In FIG. 1, the interface circuit 16 serves as a go-between for driving or reading the microprocessor 10 and the line-of-sight sensor in the line-of-sight sensing means 15.

The line-of-sight sensor arranged in the line-of-sight sensing means 15 is used to detect the position of a line of sight of a photographer looking into the viewfinder. The line-of-sight sensor is a two-dimensional CCD area sensor having X pixels horizontally and Y pixels vertically, or a total of X by Y pixels.

A signal $\Phi V$ is a vertical transfer clock signal, and a signal $\Phi H$ is a horizontal transfer clock signal. ADTRG is an external trigger signal for the A/D converter incorporated in the microprocessor 10. A signal Vout is an output signal of a sensor. SCLK, SOUT, and SIN are a serial clock, a serial output signal, and a serial input signal respectively for communication between the microprocessor 10 and the interface circuits 12 and 16. The microprocessor 10 extends control to the interface circuits 12 and 16 using mainly the three signals SCLK, SOUT, and SIN.

First, the microprocessor 10 outputs a storage start instruction to the interface circuit 16 over the serial communication lines SCLK, SOUT, and SIN, and thus instructs the line-of-sight sensor to start storage. The interface circuit 16 then outputs a signal $\Phi AB$ to the line-of-sight sensing means 15, so that storage will be performed. With the signal $\Phi AB$, the line-of-sight sensor starts storage. After a certain period of time (corresponding to a storage period) has elapsed, the microprocessor 10 outputs a storage end instruction to the interface circuit 16 over the serial communication lines SCLK, SOUT, and SIN, and thus instructs the line-of-sight sensor to terminate storage. The interface circuit 16 then stops outputting the signal $\Phi AB$ to the line-of-sight sensing means 15, so that storage will be terminated.

When storage terminates, control is extended to read stored signals from the line-of-sight sensor. Since the line-of-sight sensor is a two-dimensional area sensor, reading involves two transfer clock signals; a horizontal transfer clock signal $\Phi H$ and a vertical transfer clock signal $\Phi V$.

First, one pulse of the vertical transfer clock $\Phi V$ is output to read an output of the line-of-sight sensor for the first line. Next, the horizontal transfer clock H is output to read an output for a pixel array on the first line. Synchronously with the clock $\Phi H$, the line-of-sight sensing means 15 places an output of a pixel on Vout (See FIG. 3). After outputting one pulse of the clock $\Phi H$ to read an output of a horizontal pixel, the interface circuit 16 outputs an ADTRG signal to the microprocessor 10 according to the timing shown in FIG. 3. With the input of the ADTRG signal, the microprocessor 10 uses the built-in A/D converter to convert the Vout information from an analog form into a digital form.

Figure 3:
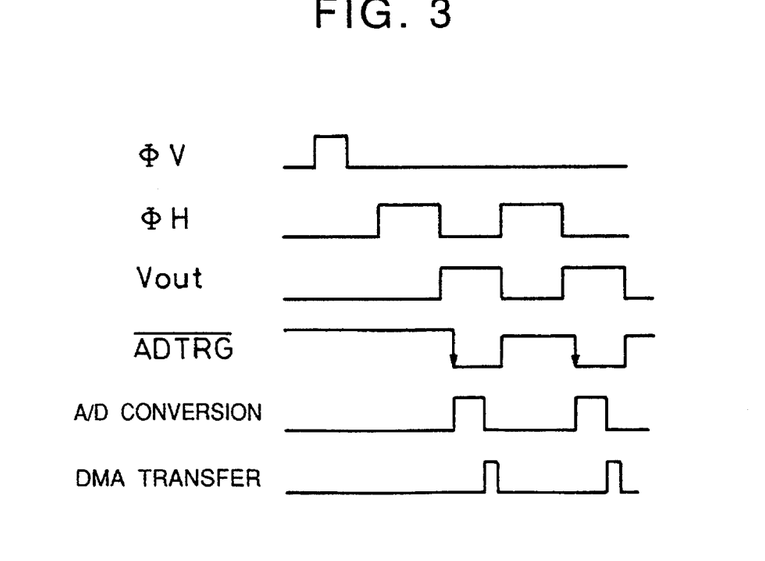
FIG. 3 is a timing chart for smoothing operations in an embodiment of the present invention.

The foregoing control is extended for the number of pixels corresponding to a horizontal line. Thereafter, one pulse of the vertical transfer clock V is output to read an output for a pixel array on the second line.

The foregoing operations are executed for the number of pixels corresponding to a vertical line.

Thus, stored signals are read from the line-of-sight sensor.

FIGS. 4 to 9 are flowcharts showing the operations in the first embodiment of the present invention. A description will be made according to the flowcharts.

Figure 4:
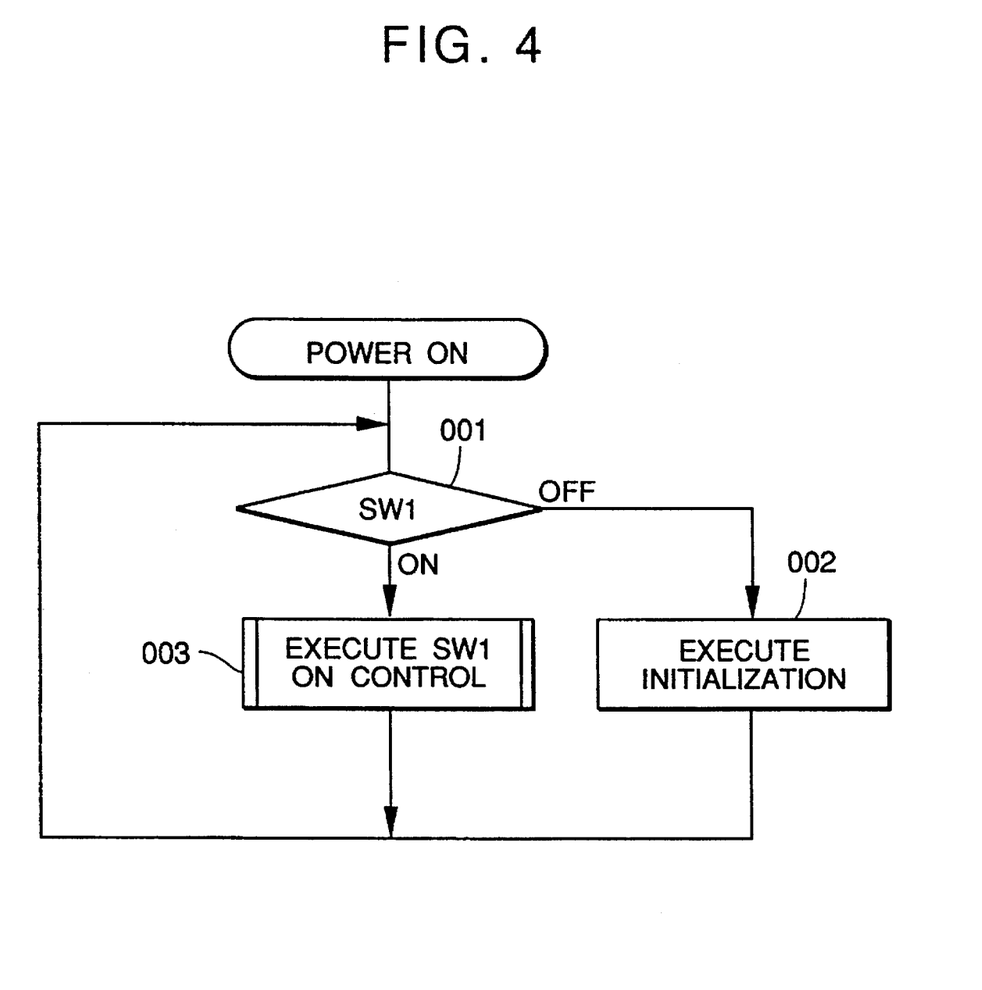
FIG. 4 is a main flowchart of a camera in an embodiment of the present invention.

When the circuits shown in FIG. 1 are energized, the microprocessor 10 starts operating at a step 001 in FIG. 4.

At the step 001, it is determined whether the switch SW1 is pressed. If the switch SW1 is not pressed, control passes to a step 002. If the switch SW1 is pressed, control passes to a step 003.

At the step 002, flags concerning photometric computation and focus detection, and variables are initialized. Control is then returned to the step 001.

At the step 003, subroutine "SW1 On Control" is executed to control photometric computation, focus detection, and line-of-sight sensing. When the subroutine terminates, control returns to the step 001.

Next, the operations of subroutine "SW1 On Control" executed at the step 003 in FIG. 4 will be described in conjunction with FIGS. 5 to 9.

Figure 5:
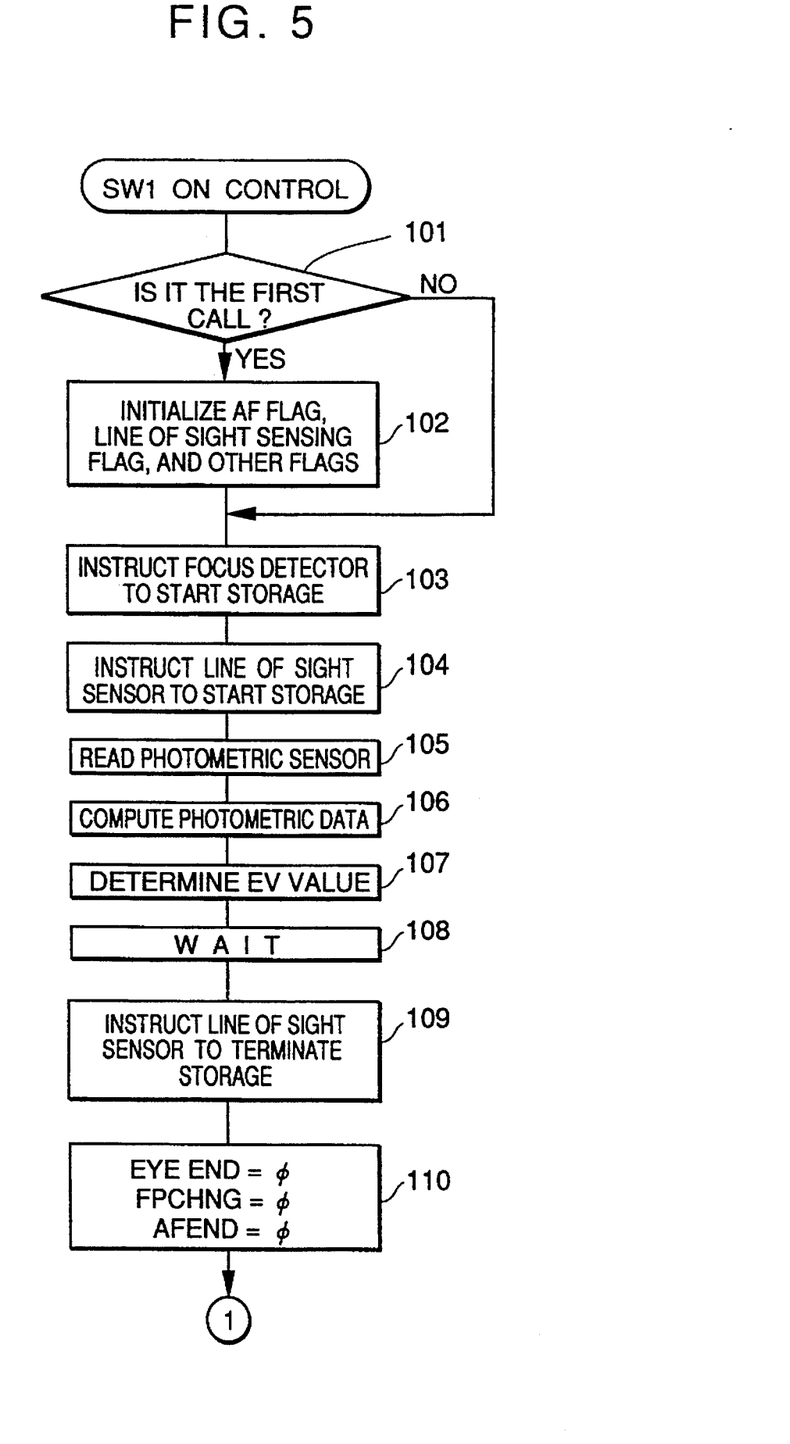
FIG. 5 is a flowchart showing the operations of subroutine "Execute SW1 On Control" of FIG. 4.

When subroutine "SW1 On Control" is called, the operations starting at a step 101 in FIG. 101 are carried out.

At the step 101, it is determined whether SW1 On Control is called for the first time. If it is the first call, control passes to a step 102. It is not the first call, control passes to a step 103.

At the step 102, initialization is performed to reset various flags and variables used for focus detection, and a flag and a variable used to control sensing of a photographer's line of sight.

At the step 103, an instruction is given to the focus detecting means 14 via the interface circuit 12 over the serial communication lines SCLK, SOUT, and SIN, which instructs the focus detector to start storage. Various parameters required for focus detection are set at this step.

At a step 104, the aforesaid signals are transferred to drive the line-of-sight sensing means 15 via the interface circuit 16. With the signal ΦAB, the line-of-sight sensor is instructed to start storage. Various parameters required for line-of-sight sensing are set at this step.

At a step 105, the photometric means 11 is driven to read the photometric sensor.

The focus detector and line-of-sight sensor are started to perform storage simultaneously. While the focus detector and the line-of-sight sensor are storing data, the photometric sensor is read and photometric computation is controlled. In short, photometry, focus detection control, and line-of-sight sensing are carried out in parallel. Consequently, time loss can be minimized.

At a step 106, photometric computation is performed to calculate the brightness of a subject using photometric information read at the step 105.

At a step 107, the brightness information of a subject calculated at the step 106 and a film sensitivity are used to calculate an EV value.

At a step 108, the procedure waits for a certain period of time to elapse for the storage of the line-of-sight sensor.

At a step 109, control is extended to terminate the storage of the line-of-sight sensor (output of the signal ΦAB is suspended).

At a step 110, flags EYEEND, FPCHNG, and AFEND are each cleared to zero. The flag EYEEND indicates whether or not line-of-sight sensing has terminated. When line-of-sight sensing terminates, the flag EYEEND is set to 1. The flag FPCHNG indicates that another range-finding point must be selected, because when focus detection is performed on a range-finding point selected by line-of-sight sensing, it is found that range finding cannot be done for the selected range-finding point. When another range-finding point must be selected, the flag FPCHNG is set to 1. The flag AFEND indicates that the focal states at all range-finding points have been detected; that is, the defocus values at all range-finding points have been calculated. When all calculations have been completed, the flag AFEND is set to 1.

Figure 6:
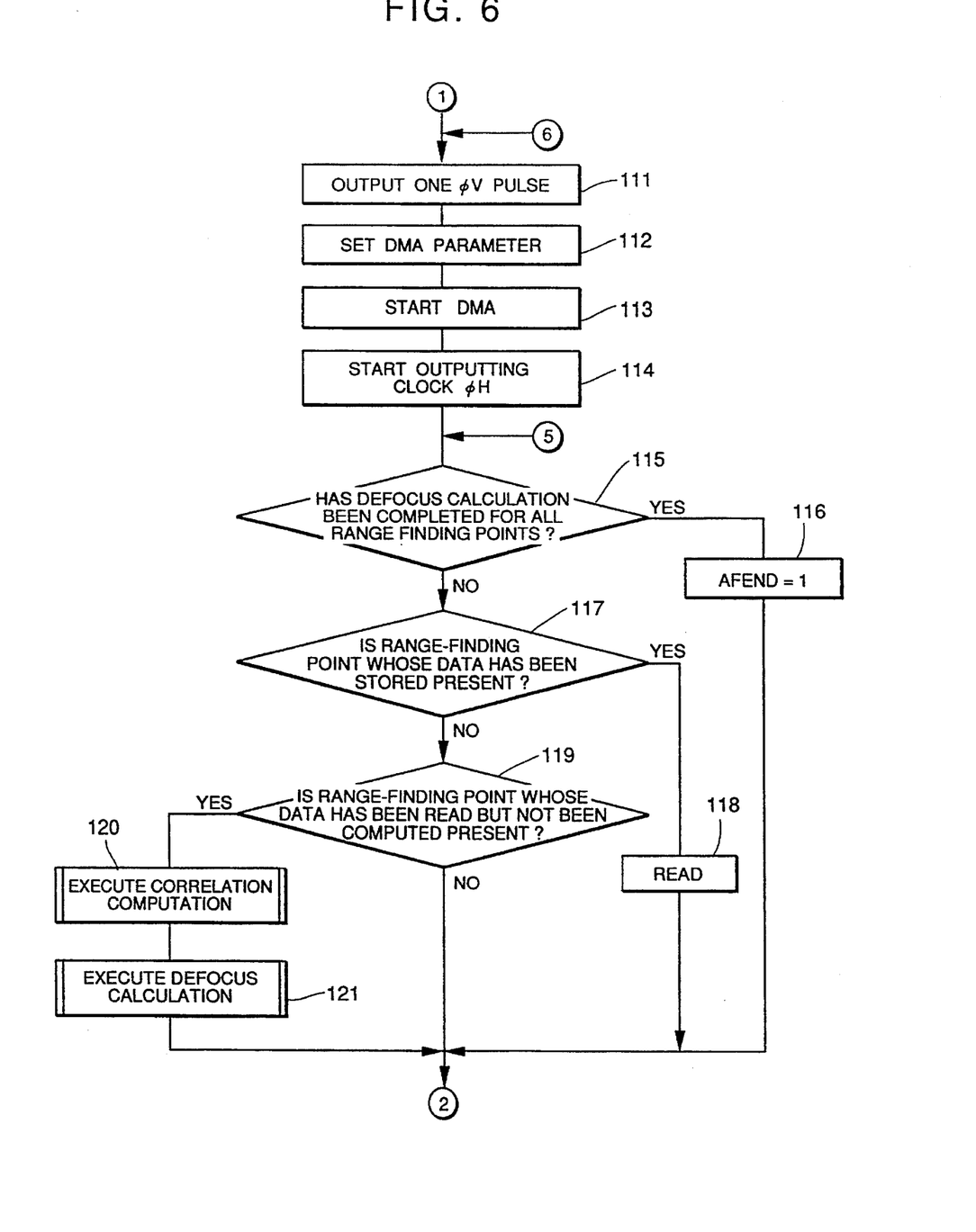
FIG. 6 is a flowchart showing the operations succeeding those in FIG. 5.

The description will be carried on according to the flowchart of FIG. 6.

At a step 111, one pulse of the vertical transfer clock V is output to read the n-th line of the line-of-sight sensor.

At a step 112, direct memory access (DMA) is performed to read an output of the line-of-sight sensor, an analog output is converted into a digital value, and the value is transferred into a specified memory in the microprocessor 10. That is to say, a memory address and other data are set as the parameters for DMA; such as, the number of transfers and a transfer destination, so that the transfer of data will be done using hardware and without software intervention.

At a step 113, DMA is enabled.

The timing of DMA execution will be described. As shown in FIG. 3, when one pulse of the horizontal transfer clock ΦH is output, a sensor places an output on Vout. According to the timing that Vout is output, the interface circuit 16 outputs a reverse signal of the ADTRG signal to the microprocessor 10 and thus instructs the microprocessor 10 to perform A/D conversion. When completing A/D conversion, the microprocessor 10 is instructed to transfer the digitized value to a specified memory.

The horizontal transfer clock ΦH is output by the built-in pulse generator PG without software intervention. Control can be extended independently of software, thus enabling parallel processing.

To be more specific, stored signals are read from the line-of-sight sensor using hardware. In the meantime or during free time, focus detection is performed using software. The processing time is thus minimized.

At a step 114, the pulse generator PG incorporated in the microprocessor 10 is used to start outputting the horizontal transfer clock ΦH.

At a step 115, it is determined whether the defocus calculation has been performed on all range-finding points. If defocus calculation has been completed, control passes to a step 116. If defocus calculation has not been completed, control passes to a step 117.

At the step 116, the flag AFEND is set to 1 to indicate that a defocus calculation has been performed on all range-finding points. Control then passes to a step 122.

At the step 117, it is determined whether a range-finding point whose data has been stored is present. If the range-finding point is present, control passes to a step 118. If the range-finding point is absent, control passes to a step 119. Whether the data of each range-finding point (area) has been stored is determined by sensing an output of a monitor sensor associated with each range-finding point.

At the step 118, the focus detector is read. Control then passes to the step 122.

If it is determined that a range-finding point whose data has been stored is absent, control passes to the step 119 as mentioned above.

At the step 119, if the focus detector is read but a range-finding point on which defocus calculation is not performed is present, control passes to a step 120. If such a range-finding point is absent, control passes to a step 122.

At the step 120, a subroutine "Correlation Computation" is executed to calculate an image deviation value using information sent from the focus detector. Control then passes to a step 121. The subroutine "Correlation Computation" has no direct relation to the present invention. The description will therefore be omitted.

At the step 121, subroutine "Defocus Calculation" is executed to calculate a defocus value. Control then passes to the step 122. The subroutine "Defocus Calculation" has no direct relation to the present invention. The description will therefore be omitted.

Figure 7:
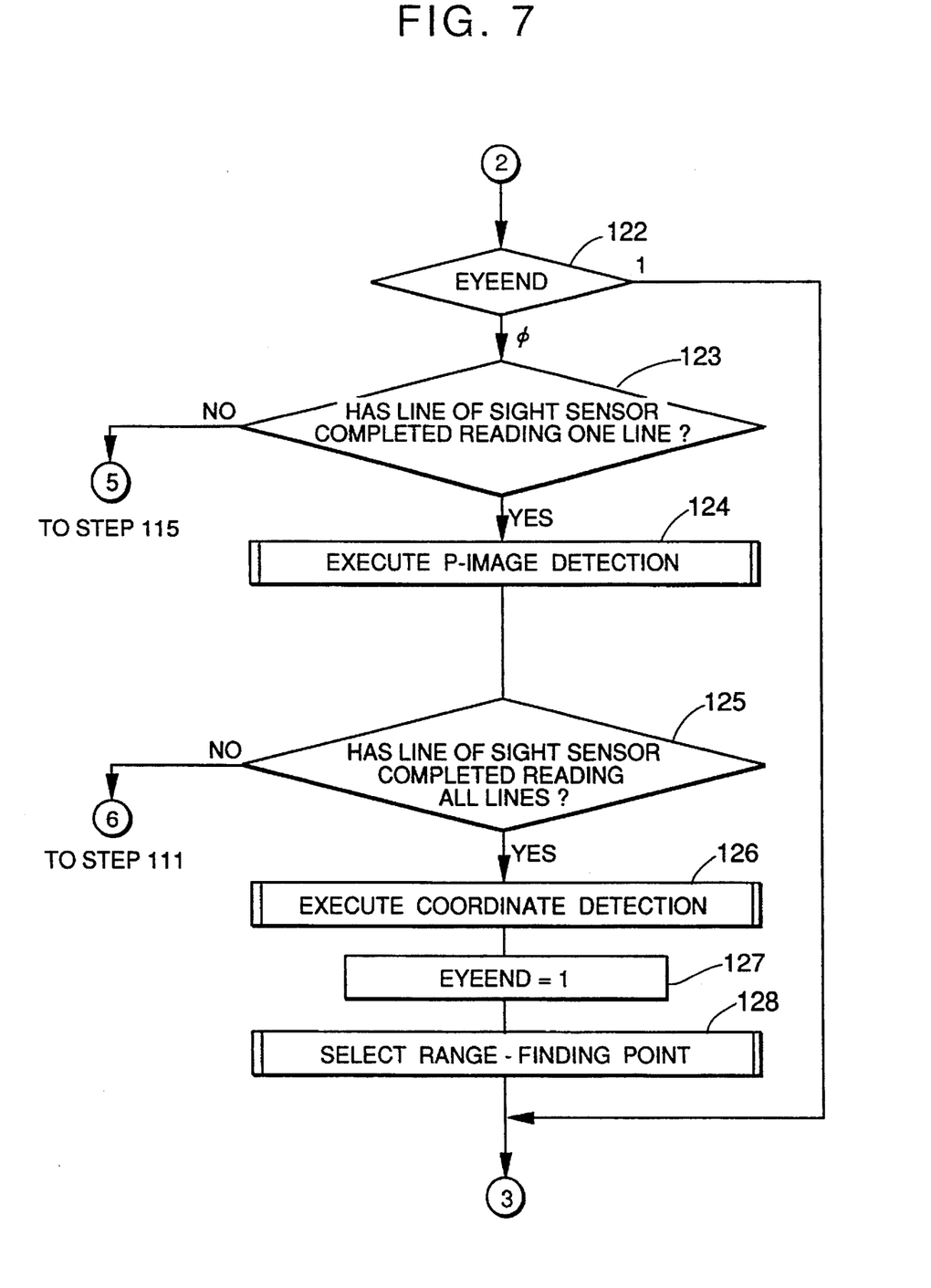
FIG. 7 is a flowchart showing the operations succeeding those in FIG. 6.

The description will be carried on according to the flowchart of FIG. 7.

At the step 122, it is determined whether line-of-sight sensing has terminated by determining the status of the flag EYEEND. If line-of-sight sensing has already terminated (EYEEND= 1), control passes to a step 130. If line-of-sight sensing has not terminated (EYEEND=0), control passes to a step 123.

At the step 123, it is determined whether reading the line-of-sight sensor for one line under the control of hardware has been completed. If the reading has not been completed, the control returns to the step 115, where control relating to focus detection is restarted.

At a step 124, since reading the line-of-sight sensor for one line has been completed, subroutine "P-image Detection" is executed to detect an image showing a Purkinje phenomenon. The subroutine "P-image Detection" has no direct relation to the present invention. The description will therefore be omitted.

At a step 125, it is determined whether reading the line-of-sight sensor for all lines have been completed. If the reading has not been completed, control returns to the step 111, and then the next line is read. If the reading has been completed, control passes to a step 126.

At the step 126, the information obtained by executing subroutine "P-image Detection" is used to execute subroutine "Coordinate Detection" for detecting coordinates in the viewfinder. The subroutine "Coordinate Detection" has no direct relation to the present invention. The description will therefore be omitted. The subroutine provides the position (coordinates) of a line of sight within the viewfinder.

At a step 127, since a photographer's line of sight has been sensed, the flag EYEEND is set to 1.

At a step 128, subroutine "Range-finding Point Selection" is executed to select a single range-finding point from among coordinates within the viewfinder. The subroutine "Range-finding Point Selection" has no direct relation to the present invention. The description will therefore be omitted. The subroutine "Range-finding Point Selection" selects a range-finding point located at the position corresponding to the coordinates of a line of sight within the viewfinder.

Figure 8:
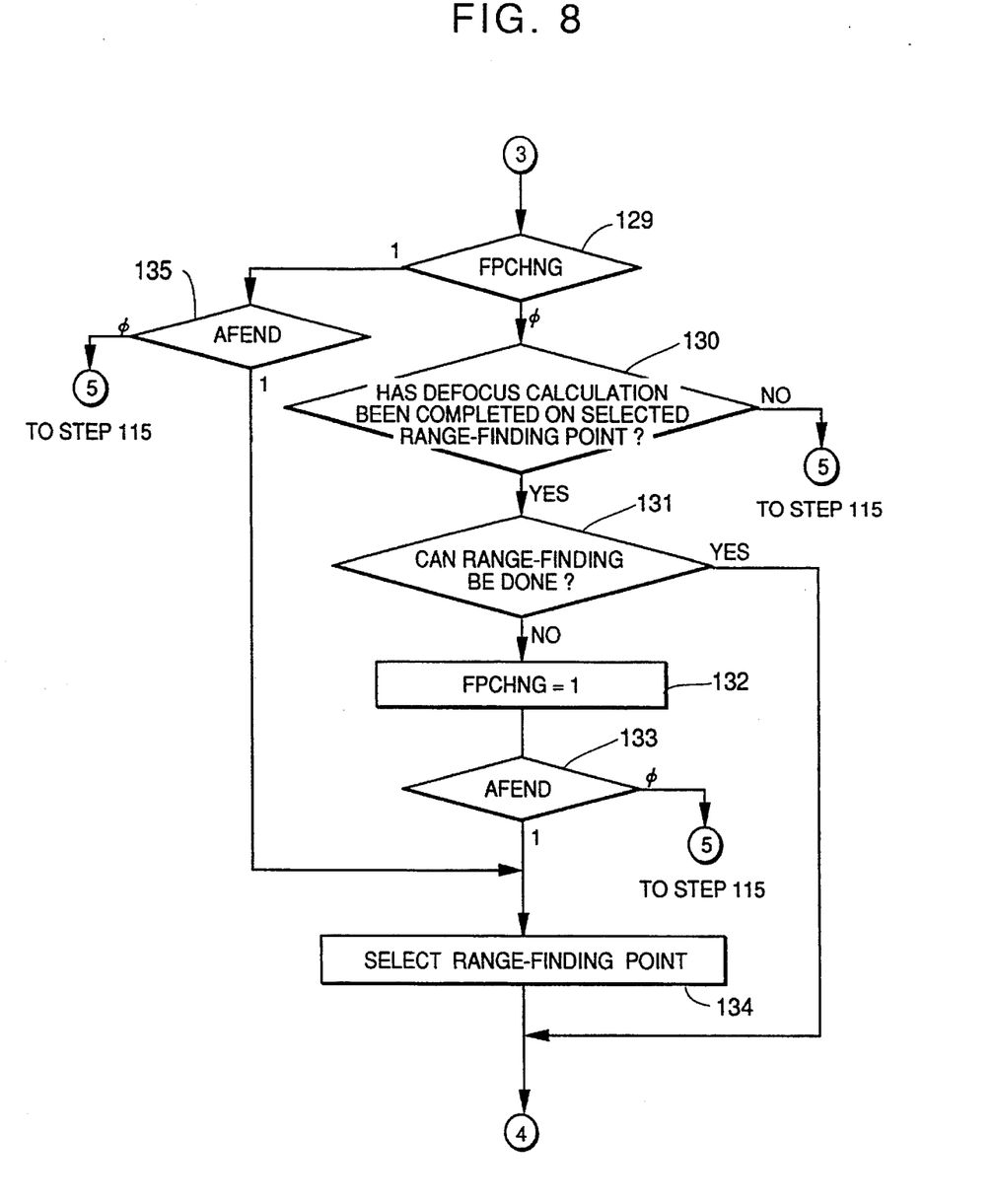
FIG. 8 is a flowchart showing the operations succeeding those in FIG. 7.

The description will be carried on according to the flowchart of FIG. 8.

At a step 129, it is determined, based on the status of flag FPCHNG, whether another range-finding point must be selected because range finding cannot be done for the range-finding point selected at the step 128. If another range-finding point need not be selected or it has not been determined whether range finding can be done for the selected range-finding point (EPCHNG=0), control passes to a step 130. If another range-finding point must be selected (FPCHNG=1), control passes to a step 135.

At the step 130, it is determined whether a defocus calculation has been completed for the selected range-finding point. If the defocus calculation has not been completed, control returns to the step 115. If defocus calculation has been completed, control passes to a step 131.

At the step 131, it is determined whether range finding can be done for the selected range-finding point. As a result, if range finding can be done for the selected range-finding point, control passes to a step 136 at which the lens is driven according to the defocus value of the range-finding point. On the other hand, if range finding cannot be done for the selected range-finding point, control passes to a step 132.

At the step 132, the flag FPCHNG indicating that another range-finding point must be selected is set to 1.

At a step 133, it is determined, based on the status of flag AFEND, whether defocus calculation has been completed for all range-finding points. If defocus calculation has not been completed for all range-finding points (AFEND=0), control returns to the step 115. If defocus calculation has been completed for all the range-finding points (AFEND=1), control passes to a step 134.

At the step 134, the defocus values of all range-finding points are analyzed to locate a main subject (for example, a subject located closest to the camera). A range-finding point corresponding to the main subject is regarded as a selected range-finding point.

If it is determined at the step 129 that another range-finding point must be selected, control passes to the step 135 as mentioned above.

At the step 135, it is determined, based on the status of flag AFEND, whether defocus calculation has been completed for all range-finding points. If defocus calculation has not been completed for all range-finding points (AFEND= 0), control returns to the step 115. If defocus calculation has been completed for all range-finding points (AFEND= 1), control passes to the step 134. Another range-finding point is then selected.

Figure 9:
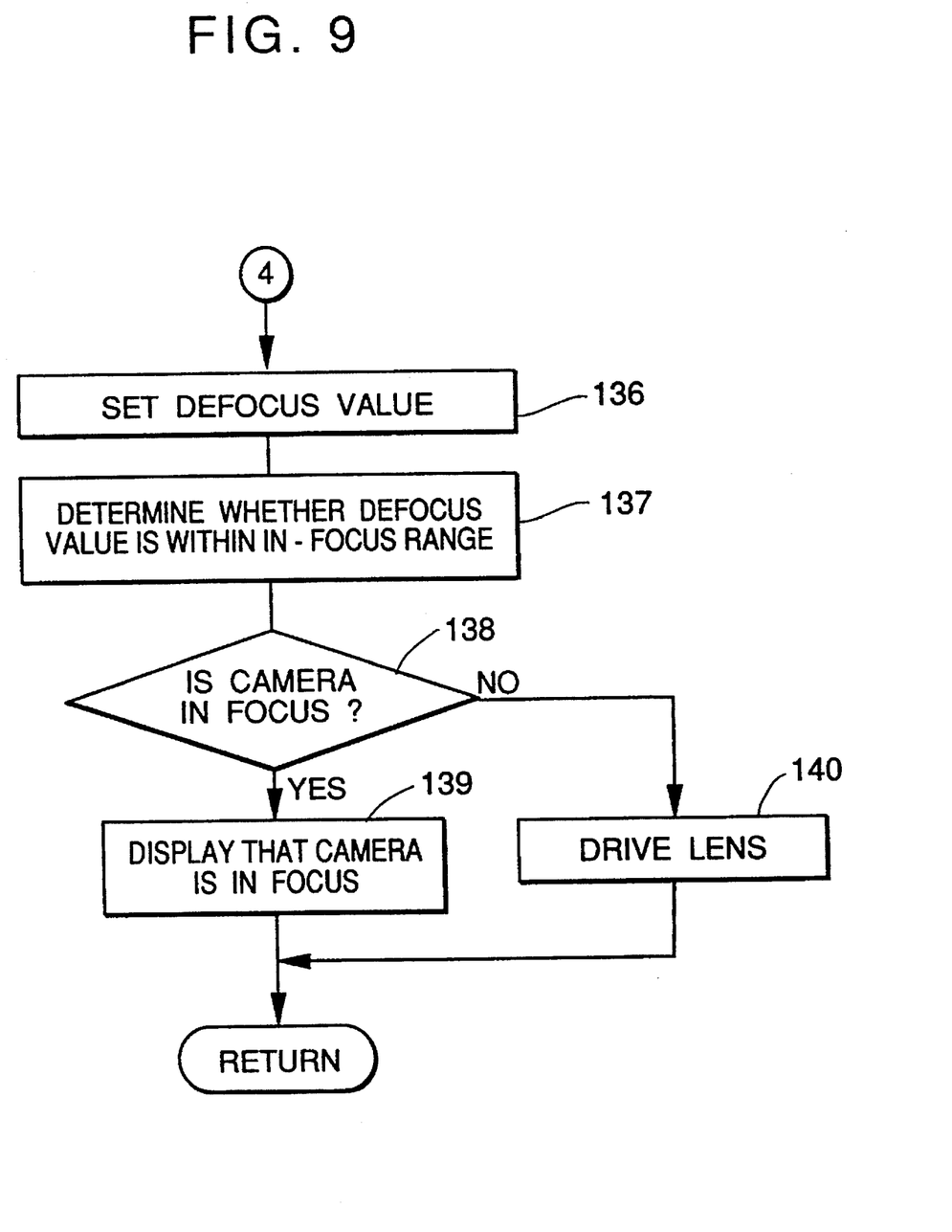
FIG. 9 is a flowchart showing the operations succeeding those in FIG. 8.

The description will be carried on according to the flowchart of FIG. 9.

At a step 136, a defocus value is set so that the lens will be driven according to the defocus value of the selected range-finding point.

At a step 137, it is determined whether the defocus value set at the step 137 is within an in-focus range.

At a step 138, it is determined whether the camera is in focus. If the camera is in focus, control passes to a step 139. If the camera is out of focus, control passes to a step 140.

At the step 139, it is displayed that the camera is in focus.

At the step 140, the lens driving means 13 is activated via the interface circuit 12, and the lens is driven.

When the aforesaid operations are complete, control returns to the main flow of FIG. 4.

According to the present invention, direct memory access (DMA) is performed in the interface circuit 16 to read an analog signal from the line-of-sight sensor, the analog signal is converted into a digital value, and the digital value is transferred into a specified memory in the microprocessor 10. Specifically, after the line-of-sight sensor completes storage, signal reading is started using hardware at the step 113 (See FIG. 6). Meanwhile, the microprocessor 10 executes focus detection beginning at the step 114 (actually, DMA is performed using free time during the focus detection). As a result, line-of-sight sensing and focus detection are carried out in parallel. Compared with the related art in which these operations are performed sequentially, the present invention minimizes the time required for the series of operations. Consequently, the camera can quickly be focused on a point (subject) a photographer is watching, and the frame rate can be upgraded. In other words, a camera is realized in which the likelihood of a photographer missing a shutter chance is reduced.

The individual components shown in outline or designated by blocks in the drawings are all well-known in the camera arts and their specific construction and operation are not critical to the operation or best mode for carrying out the invention.

Although the present invention has been described with respect to what is presently considered the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera, comprising:

a line-of-sight sensing circuit for sensing a position of a photographer's line-of-sight; and a processing circuit for controlling each of (i) the line-of-sight sensing operation and (ii) at least one other photographic processing operation;

wherein said processing circuit controls said line-of-sight sensing circuit to sense the photographer's line-of-sight in parallel with the at least one other photographic processing operation.

2. A camera according to claim 1, wherein the at least one other photographic processing operation comprises focus detection.

3. A camera according to claim 1, wherein the at least one other photographic processing operation comprises photometry.

4. A camera, comprising:

a line-of-sight sensing circuit for sensing a position of a photographer's line-of-sight, said line-of-sight sensing circuit including a storage sensor for storing signals corresponding to the position of the photographer's line-of-sight; and a microprocessor for calculating (i) the position of the photographer's line-of-sight according to the signals stored in said storage sensor, and (ii) at least one other photographic computation;

wherein said microprocessor performs the at least one other photographic computation while said first storage sensor stores the signals corresponding to the position of the photographer's line-of-sight.

5. A camera according to claim 4, wherein the at least one other photographic computation comprises photometric computation.

6. A camera, comprising:

a line-of-sight sensing circuit for sensing a position of a photographer's line-of-sight, said line-of-sight sensing circuit including a storage sensor for storing signals corresponding to the position of the photographer's line-of-sight;

a microprocessor for calculating (i) the position of the photographer's line-of-sight according to the signals stored in said storage sensor, and (ii) at least one other photographic computation; and a hardware circuit for serially transferring the signals stored in said storage sensor to said microprocessor;

wherein said microprocessor performs the at least one other photographic computation while said hardware circuit is serially transferring the signals stored in said storage sensor to said microprocessor.

7. A camera according to claim 6, wherein said storage sensor comprises a two-dimensional sensor having a plurality of lines, and wherein said hardware circuit transfers a signal for each line of said two-dimensional sensor.

8. A camera according to claim 6, wherein the at least one other photographic computation comprises focus detection computation.

9. A camera having a focus detecting circuit for detecting focus states in a plurality of focus detection areas, and a line-of-sight sensing circuit for sensing a position of a photographer's line-of-sight, said camera comprising:

a control circuit for inhibiting the focus detecting circuit from performing further focus state detection when each of the following two conditions are satisfied:

(i) the line-of-sight sensing circuit has completed line-of-sight sensing, and (ii) the focus detecting circuit has detected a focus state in a focus detection area associated with a sensed position of a photographer's line-of-sight.

10. A camera according to claim 9, wherein line-of-sight sensing by the line-of-sight sensing circuit is performed in parallel with focus state detection by the focus detecting circuit.

11. A camera according to claim 9, wherein when focus detection cannot be performed for a focus detection area associated with the sensed position of the photographer's line-of-sight, said control circuit enables further focus state detection even after line-of-sight sensing has been completed.

12. A camera according to claim 10, wherein when the line-of-sight sensing has been completed, if detection of the focus state in a focus detection area associated with the sensed position of the photographer's line-of-sight has not been completed, said control circuit controls the focus detecting circuit to continue focus state detection until the detection of the focus state in the focus detection area associated with the position of the photographer's line-of-sight is completed.

13. A camera according to claim 12, wherein line-of-sight sensing by the Nine-of-sight sensing circuit is performed in parallel with focus state detection by the focus detecting circuit.

14. A camera having a focus detecting circuit for detecting focus states in a plurality of focus detection areas and a line-of-sight sensing circuit for sensing a position of a photographer's line-of-sight, said camera comprising:

a control circuit for controlling each of the focus detecting circuit and the line-of-sight sensing circuit to perform focus state detection and line-of-sight sensing in parallel.

15. A camera according to claim 14, wherein said control circuit (i) inhibits further focus state detection when a focus state can be detected in a focus detection area associated with the sensed position of the photographer's line-of-sight, and (ii) enables focus state detection when the focus state cannot be detected in the detection area associated with the sensed position of the photographer's line-of-sight.

16. A camera, comprising:
   a line-of-sight sensing circuit for sensing a position of a person's line-of-sight; and
   a processing circuit for controlling each of (i) the line-of-sight sensing operation and (ii) at least one other processing operation;
   wherein said processing circuit controls said line-of-sight sensing circuit to sense the person's line-of-sight operating in parallel with at least one other processing operation.

17. A camera according to claim 16, wherein at least one other processing operation comprises focus detection.

18. A camera according to claim 16, wherein at least one other processing operation comprises photometry.

19. A camera, comprising:
   a line-of-sight sensing circuit for sensing a position of a person's line-of-sight, said line-of-sight sensing circuit including a storage sensor for storing signals corresponding to the position of the person's line-of-sight; and
   a microprocessor for calculating (i) the position of the persons line-of-sight according to the signals stored in said storage sensor, and (ii) at least one other computation;
   wherein said microprocessor performs at least one other computation while said storage sensor stores the signals corresponding to the position of the person's line-of-sight.

20. A camera, comprising:
   a line-of-sight sensing circuit for sensing a position of a person's line-of-sight, said line-of-sight sensing circuit including a storage sensor for storing signals corresponding to the position of the person's line-of-sight;
   a microprocessor for calculating (i) the position of the person's line-of-sight according to the signals stored in said storage sensor, and (ii) at least one other computation; and
   a hardware circuit for serially transferring the signals stored in said storage sensor to said microprocessor;
   wherein said microprocessor performs at least one other computation while said hardware circuit is serially transferring the signals stored in said storage sensor to said microprocessor.

21. A processing system having a line-of-sight detecting device, comprising:
   a line-of-sight sensing circuit for sensing a position of a person's line-of-sight; and
   a processing circuit for controlling each of (i) the line-of-sight sensing operation and (ii) at least one other processing operation;
   wherein said processing circuit controls said line-of-sight sensing circuit to sense the person's line-of-sight operating in parallel with at least one other processing operation.

22. A processing system having a line-of-sight detecting device, comprising:
   a line-of-sight sensing circuit for sensing a position of a person's line-of-sight, said line-of-sight sensing circuit including a storage sensor for storing signals corresponding to the position of the person's line-of-sight; and
   a microprocessor for calculating (i) the position of the persons line-of-sight according to the signals stored in said storage sensor, and (ii) at least one other computation;
   wherein said microprocessor performs at least one other computation while said storage sensor stores the signals corresponding to the position of the person's line-of-sight.

23. A processing system having a line-of-sight detecting device, comprising:
   a line-of-sight sensing circuit for sensing a position of a person's line-of-sight, said line-of-sight sensing circuit including a storage sensor for storing signals corresponding to the position of the person's line-of-sight;
   a microprocessor for calculating (i) the position of the person's line-of-sight according to the signals stored in said storage sensor, and (ii) at least one other computation; and
   a hardware circuit for serially transferring the signals stored in said storage sensor to said microprocessor;
   wherein said microprocessor performs at least one other computation while said hardware circuit is serially transferring the signals stored in said storage sensor to said microprocessor.

\* \* \* \* \*

UNITED STATES PATENT AND TRADEMARK OFFICE
CERTIFICATE OF CORRECTION

PATENT NO. : 5,467,161
DATED : November 14, 1995
INVENTOR(S) : YUKIO ODAKA

It is certified that error appears in the above-indentified patent and that said Letters Patent is hereby corrected as shown below:

COLUMN 10

Line 50, "Nine-of-sight" should read --line-of-sight--.

COLUMN 11

Line 23, "persons" should read --person's--.

COLUMN 12

Line 21, "persons" should read --person's--.

Signed and Sealed this

Twenty-third Day of April, 1996

Attest:

BRUCE LEHMAN

Attesting Officer

Commissioner of Patents and Trademarks